(12) United States Patent
Kazakov

(10) Patent No.: US 12,165,016 B2
(45) Date of Patent: Dec. 10, 2024

(54) DIRECT-CONNECTED MACHINE LEARNING ACCELERATOR

(71) Applicant: Advanced Micro Devices, Inc., Santa Clara, CA (US)

(72) Inventor: Maxim V. Kazakov, San Diego, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 1112 days.

(21) Appl. No.: 17/032,778

(22) Filed: Sep. 25, 2020

(65) Prior Publication Data

US 2022/0101179 A1 Mar. 31, 2022

(51) Int. Cl.
*G06F 13/40* (2006.01)
*G06F 9/30* (2018.01)
*G06F 9/50* (2006.01)
*G06N 20/00* (2019.01)

(52) U.S. Cl.
CPC ......... *G06N 20/00* (2019.01); *G06F 9/30036* (2013.01); *G06F 9/5011* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 11,467,835 B1* | 10/2022 | Sengupta | G06F 9/3005 |
| 2019/0347125 A1* | 11/2019 | Sankaran | G06F 9/3004 |
| 2020/0034699 A1* | 1/2020 | Jang | G06F 7/5443 |
| 2020/0371984 A1* | 11/2020 | Patil | G06F 13/4282 |
| 2020/0393997 A1* | 12/2020 | Lanka | G06F 3/0608 |
| 2021/0098381 A1* | 4/2021 | Yu | H01L 21/4857 |

* cited by examiner

*Primary Examiner* — Michael Sun
(74) *Attorney, Agent, or Firm* — Volpe Koenig

(57) ABSTRACT

Techniques are disclosed for communicating between a machine learning accelerator and one or more processing cores. The techniques include obtaining data at the machine learning accelerator via an input/output die; processing the data at the machine learning accelerator to generate machine learning processing results; and exporting the machine learning processing results via the input/output die, wherein the input/output die is coupled to one or more processor chiplets via one or more processor ports, and wherein the input/output die is coupled to the machine learning accelerator via an accelerator port.

20 Claims, 5 Drawing Sheets

DIRECT-CONNECTED MACHINE LEARNING ACCELERATOR

BACKGROUND

Machine learning operations involve computing and transmitting a large amount of data, which can place strain on computing resources. Improvements to machine learning operations are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques are disclosed for communicating between a machine learning accelerator and one or more processing cores. The techniques include obtaining data at the machine learning accelerator via an input/output die; processing the data at the machine learning accelerator to generate machine learning processing results; and exporting the machine learning processing results via the input/output die, wherein the input/output die is coupled to one or more processor chiplets via one or more processor ports, and wherein the input/output die is coupled to the machine learning accelerator via an accelerator port.

Figure 1:
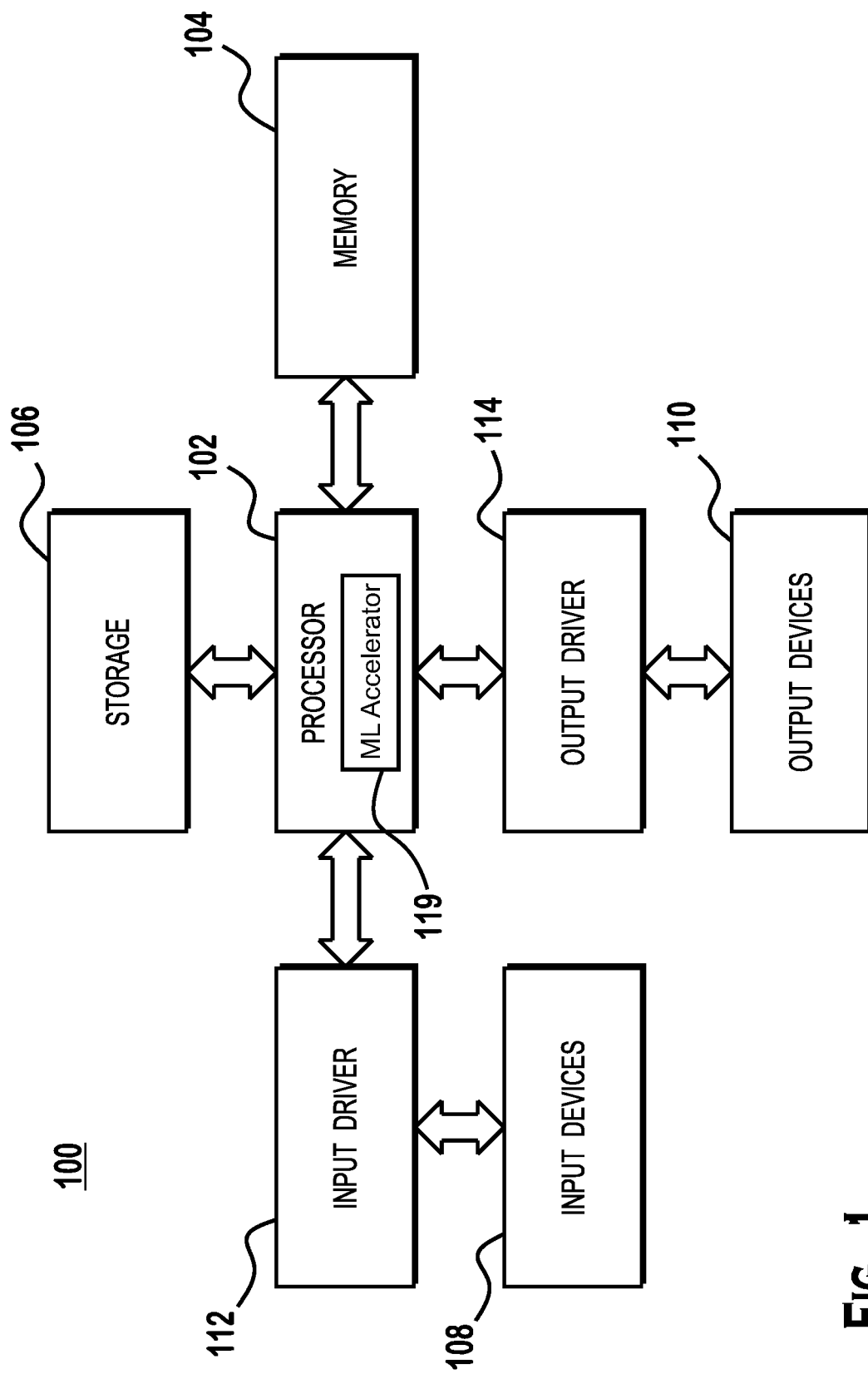
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110.

The processor 102 includes a machine learning (ML) accelerator 119. The ML accelerator includes processing components (such as circuitry and/or one or more processors that execute instructions) that perform machine learning operations. In some examples, machine learning operations include performing matrix multiplications or performing convolution operations.

Figure 2A:
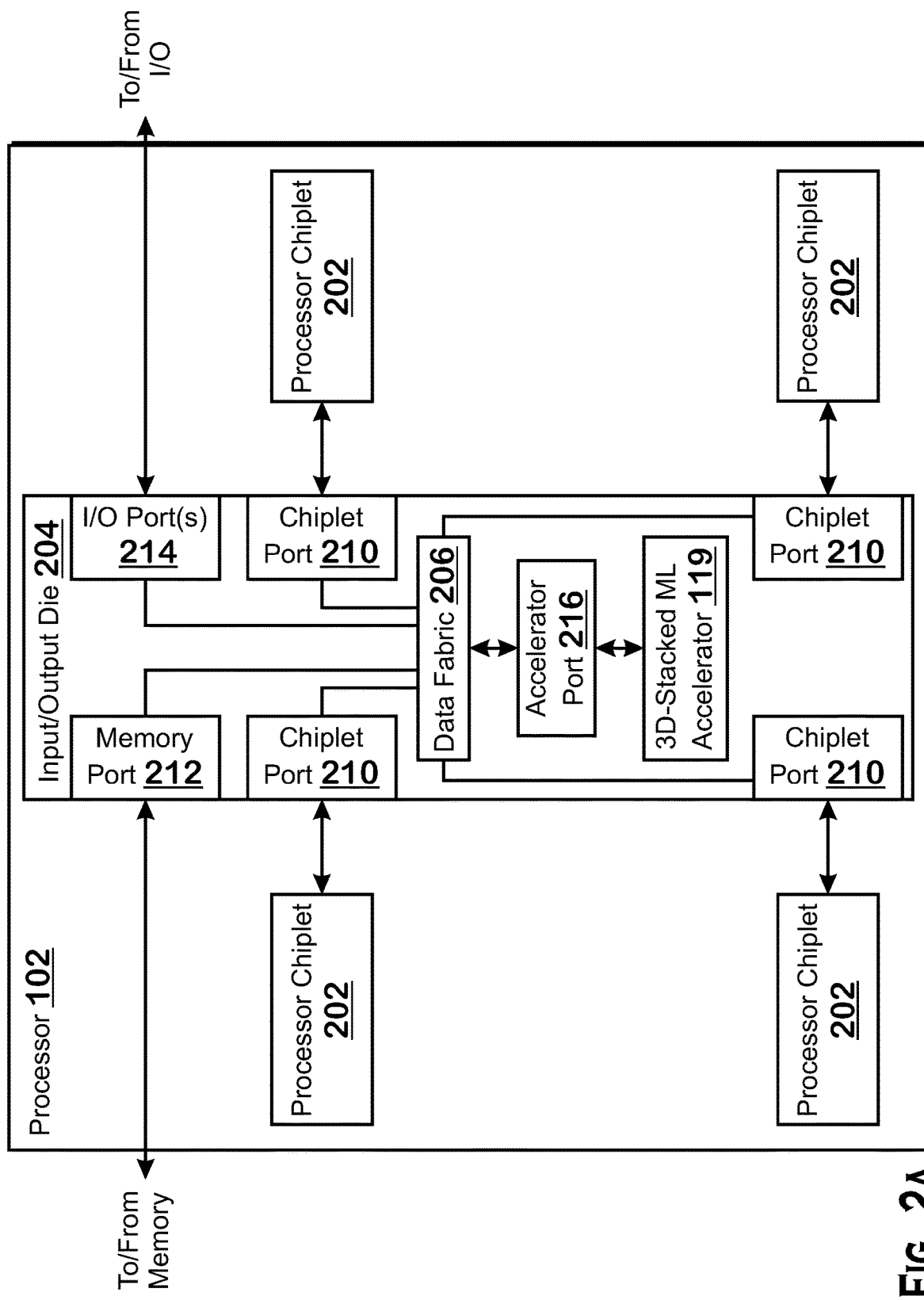
FIG. 2A illustrates an example processor including a machine learning accelerator.
Figure 2B:
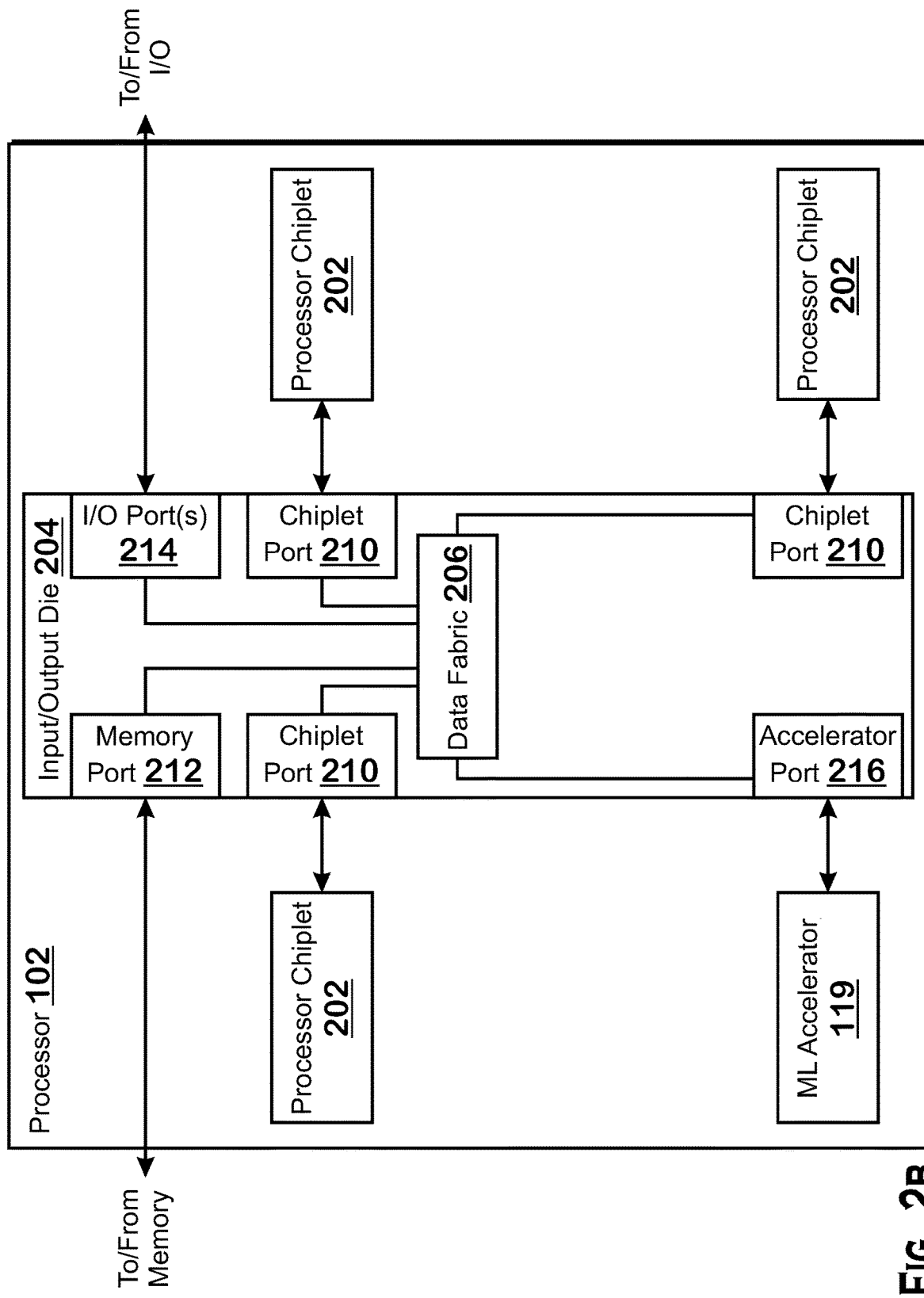
FIG. 2B illustrates another example processor including a machine learning accelerator.

FIGS. 2A and 2B illustrate example architectures of the processor 102, including a machine learning accelerator 119 coupled to an internal input/output die of the processor 102. The machine learning accelerator 119 provides hardware acceleration for machine learning operations. One approach to coupling the machine learning accelerator 119 to a central processing unit, which is within the processor 102, would be via an expansion bus such as the peripheral component interconnect express (PCIe) bus. However, machine learning operations often require bandwidth that is greater than what is available over such busses. Thus, in the present disclosure, a machine learning accelerator is directly connected to an input/output die of the processor 102. The input/output die directly communicates with individual central processing unit ("CPU") cores and thus entities coupled to the input/output die can have much greater bandwidth than what is available over the expansion busses. FIGS. 2A and 2B illustrate example processors 102 including a machine learning accelerator 119 that is directly coupled to an input/output die of the processor 102.

In FIG. 2A, the processor 102 includes one or more processor chiplets 202, each of which is communicatively coupled to the input/output die 204. In addition, a machine learning accelerator is stacked on top of the input/output die 204 and communicatively coupled to the input/output die 204. The term "stacked" means that the machine learning accelerator 119 is physically on top of the input/output die 204. This stacking is sometimes referred to as three-dimensional stacking ("3D stacking"). Stacking in this manner provides the machine learning accelerator 119 with more physical locations at which to attach communication wires to the input/output die 204, which provides a high amount of bandwidth between the machine learning accelerator 119 and the input/output die 204.

The processor chiplets 202 include one or more central processing unit cores. The central processing unit cores have traditional central processing unit logic, such as fetch and decode logic, execute logic, logic to access memory, and other logic. In some implementations, the central processing unit cores alternatively or additionally include one or more caches such as one or more lowest-level caches.

The input/output die 204 includes a data fabric 206, chiplet ports 210, one or more memory ports 212, one or more input/output ports 214, an accelerator port 216, and a three-dimensional stacked machine learning accelerator 119. Each of the ports (chiplet ports 210, accelerator port 216, memory port 212, input/output ports 214) of the input/output die 204 provides access for an entity coupled to that port to the data fabric 206. Some types of access to the data fabric includes master-based access. A device with master-based access is permitted to read from or write to any other entity that has slave access to the data fabric 206. Example devices that have slave access include the memory port 212 and the input/output ports 214. A deice with slave-based access receives and responds to requests or commands from devices with master-based access. In an example, any processor core on any processor chiplet 202 is permitted to access any entity connected to a slave port. In another example, any processor chiplet 202 is permitted to write to any input/output device coupled to the i/o port(s) 214, and any input/output device is permitted to respond to a master request of any processor 202. Typically, input/output devices, themselves, are coupled to a routing network, such as peripheral component interconnect express (PCIe), and this routing network is coupled to the i/o port(s) 214.

The data fabric 206 is a routing network that facilitates transaction routing between devices connected to the ports. More specifically, the data fabric 206 includes wires and routing logic. The routing logic processes transaction requests made at the ports by the devices. Such requests include transmitting information to another device coupled to another port. The routing logic processes these requests by accepting the data from one port and transmitting the data across the wires to a different port, which provides that data to a destination specified by the transaction request. In general, the data fabric 206 has extremely high bandwidth necessary for routing data between multiple processors and peripheral devices such as memory-attached devices and devices attached to the i/o port(s) 214.

In some implementations, the processor chiplets 202 are fabricated with a smaller semiconductor scale than the input/output die 204. The processor chiplets 202 are thus physically different dies than the input/output die 204. The input/output die 204 typically includes many analog electrical components that do not scale well with process scale due to physical requirements such as capacitance. Thus, including an input/output die 204 that is a physical entity that is separate from the processor chiplets 202 allows manufacturing efficiency due to reduced requirements for the data fabric 206 as compared with including routing logic within a single die with processing cores.

The machine learning accelerator 119 has very high bandwidth requirements due to the amount of data being processed by the machine learning accelerator 119. Thus, instead of being connected to the processor 102 indirectly, through an expansion bus or other similar interconnect such as PCIe, the machine learning accelerator 119 is directly connected to the input/output die 204 through an accelerator port 216. In various implementations, the accelerator port 216 combines the slave port capabilities of slave-attached devices, meaning that the accelerator port 216 allows the machine learning accelerator 119 to respond to master requests from processor cores, and also allows the machine learning accelerator 119 to drive master requests to other device such as memory and i/o devices. In addition, in the implementation of FIG. 2A, the machine learning accelerator 119 is three-dimensionally stacked on the input/output die 204. The accelerator port 216 allows the 3D-stacked ML accelerator 119 to direct communications at any other device that is coupled to the input/output die 204 via a port. The 3D-stacked ML accelerator 119 specifies which device is to receive such communications and the data fabric 206 provides the data embedded in such communication to the specified device. In addition, any device that is coupled directly to a port of the input/output die 204 is able to direct communications at the 3D-stacked ML accelerator 119. In response to such communication, the data fabric 206 routes the data directly to the ML accelerator 119 through the accelerator port 216.

The fact that the 3D-stacked ML accelerator 119 is directly coupled to the data fabric 206 via a port means that communications between the ML accelerator 119 and other entities, such as a CPU core (e.g., in a chiplet 202) or memory (such as memory 104) has the full bandwidth of the data fabric. This bandwidth is typically many times greater than the bandwidth of an interconnect bus such as PCIe. In general, communication between entities coupled to a port includes one entity transmitting data from another entity, one entity requesting data from another entity, or more generally, one entity transmitting one or more commands to another entity, where some such commands result in data transmission over the data fabric 206 between the entities.

FIG. 2B is a block diagram of an example implementation in which the machine learning accelerator 119 is coupled directly to the input/output die 204 via a port, but the machine learning accelerator 119 is not three-dimensionally stacked on top of that input/output die.

In some implementations, the ML accelerator 119 replaces, and is thus in the same physical location as a processor chiplet 202. As with the implementations of FIG. 2A, the ML accelerator 119 is coupled to the input/output die 204 via an accelerator port 216. In some implementations, the accelerator port 216 is a replacement for (and thus in approximately the same location as) a chiplet port 210 of FIG. 2A.

Figure 3:
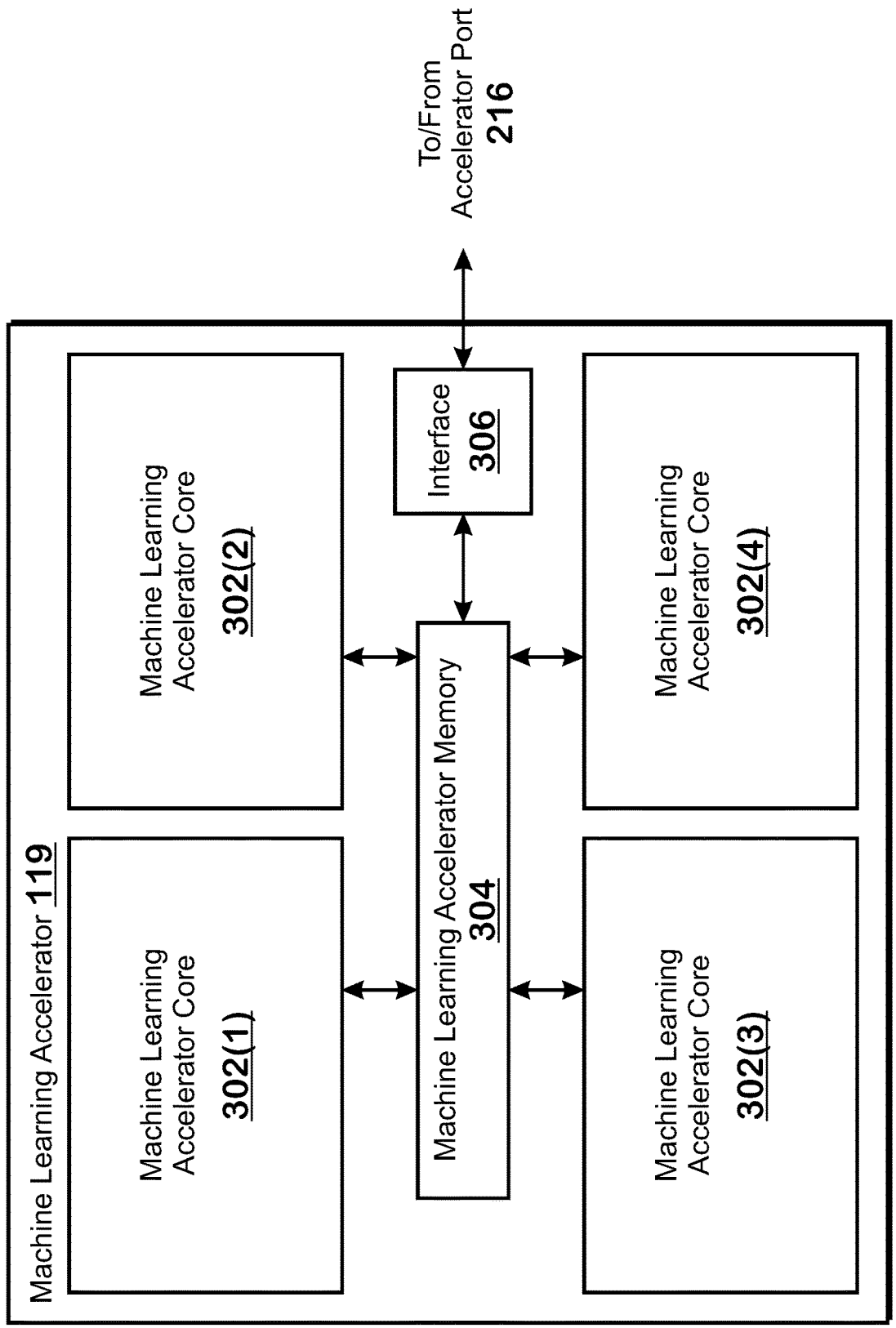
FIG. 3 is a block diagram illustrating additional details of the machine learning accelerator ("ML accelerator"), according to an example.

FIG. 3 is a block diagram illustrating additional details of the machine learning accelerator ("ML accelerator") 119, according to an example. The ML accelerator 119 includes one or more machine learning accelerator cores 302. In some examples, the machine learning accelerator cores 302 include circuitry for performing matrix multiplications. The machine learning accelerator 119 also includes a machine learning accelerator memory 304 coupled to the machine learning accelerator cores 302 and an interface 306. The interface 306 communicably couples the machine learning accelerator memory 304 to the accelerator port 216.

In various examples, the matrix multiplications of the ML accelerator 119 are used, for example, by one or more processing chiplets 202, to implement machine learning operations including training and inference operations. Inference operations include applying inputs to a machine learning network and obtaining a network output such as a classification or other output. Training operations include applying training inputs to a machine learning network and modifying the weights of the network according to a training function.

As is generally known, a machine learning network includes a series of one or more layers. Each layer applies one or more operations such as a general matrix multiply, a convolution, a step function, or other operations, and provides an output. Some layer types implement operations that model artificial neurons. More specifically, some layer types implement operations in which inputs to the layer are provided to one or more artificial neurons. Each artificial neuron applies a weight to inputs, sums the weighted inputs, and, optionally, applies an activation function. The weighted sums of neuron inputs are implemented as matrix multiplications performed within the machine learning accelerator core 302. In another example, a layer implements convolutions. A convolution includes multiple instances of performing a dot product of a filter with a set of pixel values from an image. Because multiple of these dot products are performed, convolution operations are mapped to matrix multiplication operations on the machine learning accelerator cores 302. It should be understood that although matrix multiplication operations are generally described as being performed by the machine learning accelerator cores 302, in various alternative implementations, these cores 302 perform additional and/or alternative operations as well.

During operation, the machine learning accelerator 119 interfaces with and communicates with memory such as memory 104. This communication occurs through the accelerator port 216 as described elsewhere herein. In some examples, the machine learning accelerator fetches weight and/or input values for a layer from memory, performs operations such as matrix multiplication or convolutions for that layer, and provides the results of such operations to memory. Each communication with memory is through the accelerator port 216 and thus benefits from the high bandwidth of direct communication via the input/output die 204.

In some examples, one or more processor chiplets 202 controls operations on the machine learning accelerator 119 via the input/output die 204. In various examples, controlling operations includes instructing the ML accelerator 119 regarding which data to fetch, what operations to perform, and where to store resulting data. In some examples, for a given layer, one or more processor chiplets 202 instructs the ML accelerator 119 to fetch inputs for that layer, instructs the ML accelerator 119 to perform specific operations on those inputs to generate outputs, and instructs the ML accelerator 119 to store the outputs for that layer in a specific location (e.g., in memory).

Figure 4:
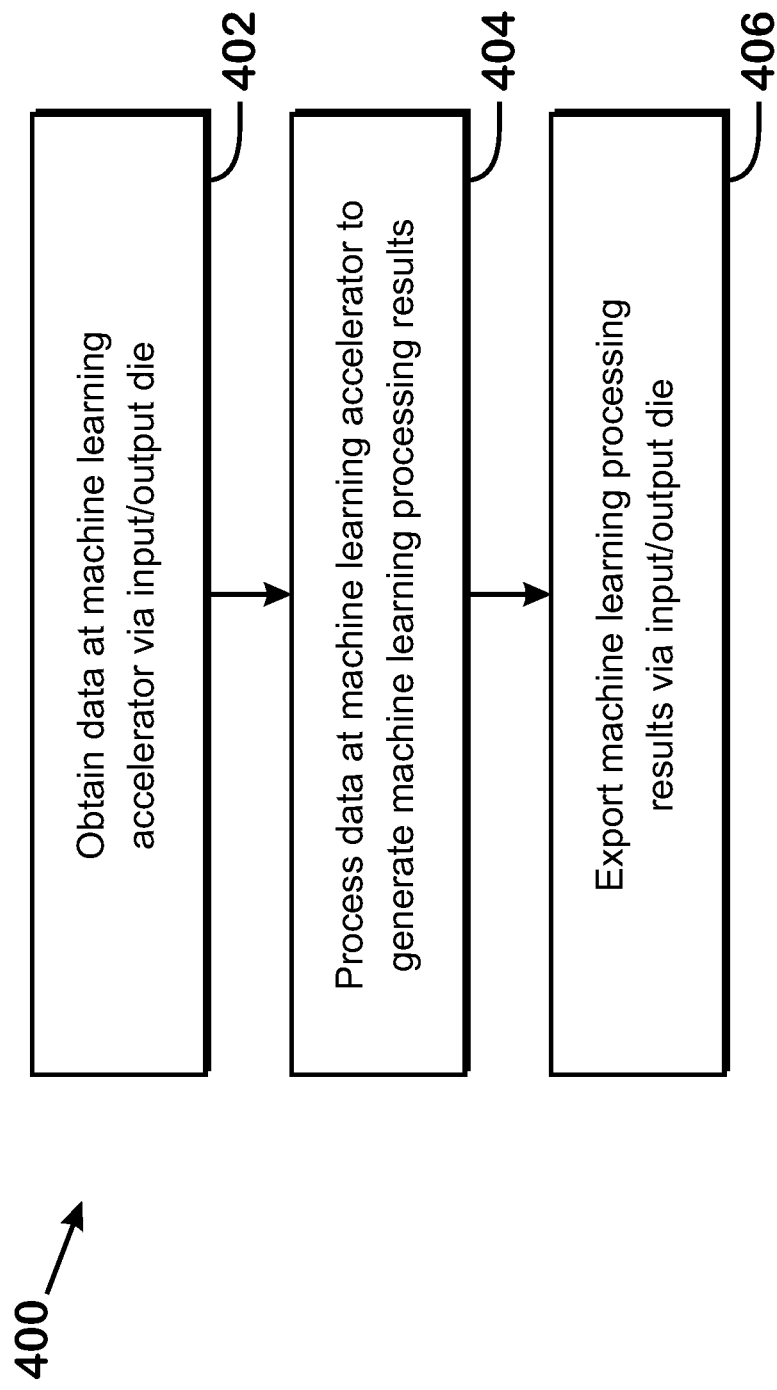
FIG. 4 is a flow diagram of a method for operating a machine learning accelerator, according to an example.

FIG. 4 is a flow diagram of a method 400 for operating a machine learning accelerator 119, according to an example. The steps of method 400 could be performed in any technically feasible order.

At step 402, the machine learning accelerator 119 obtains data from a source via the input/output die 204. As described elsewhere herein, the input/output die 204 includes multiple ports, such as a processor chiplet port 210, a memory port 212, an input/output port 214, and an accelerator port 216. The machine learning accelerator 119, memory 104, and processor chiplets 202, are coupled to the input/output die 204 via the ports. The input/output die 204 includes a data fabric 206 that routes data between the ports with high bandwidth connections. An entity coupled to the input/output die 204 via a port sends a request that specifies, as a target, one of the entities that is directly coupled to one of the ports. In an example operation corresponding to step 402, one of the processor chiplets 202 transmits data, such as inputs for a neural network layer, to the machine learning accelerator 119 via the input/output die 204, specifying the machine learning accelerator 119 as the target. In some examples, the machine learning accelerator 119 is three-dimensionally stacked on the input/output die 204.

At step 404, the machine learning accelerator 119 processes the data received from the input/output die 204. This processing can be performed in any manner. In various examples, the data are inputs to a general matrix multiply layer, and the machine learning accelerator performs general matrix multiply operation on the data. In other examples, the data are inputs to a convolution layer and the machine learning accelerator 119 performs convolution operations on the data.

At step 406, the machine learning accelerator 119 exports the results of the machine learning operations via the input/output die 204. The destination for the export is programmable and dependent on the specific operations being performed. In an example, the machine learning accelerator 119 provides the results to memory 104 to be operated on by the machine learning accelerator 119 or another entity at a future time. The export occurs via the machine learning accelerator port 216 and the data fabric 206 of the input/output die 204.

Each of the units illustrated in the figures represents one or more of hardware configured to perform the described operations, software executable on a processor, wherein the software is configured to perform the described operations, or a combination of software and hardware. In an example, the storage 106, memory 104, processor 102, display device 18, output driver 114, ML accelerator 119, output devices 110, input driver 112, and input devices 108, are all hardware circuitry that perform the functionality described herein. In various examples, the elements of the ML accelerator 119, including the machine learning accelerator core 302, the machine learning accelerator memory 304, and the interface 306 are hardware circuitry that perform the functions described herein.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a graphics processor, a machine learning processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processor, comprising:
one or more processor chiplets;
an input/output die; and
a machine learning accelerator, wherein the machine learning accelerator is stacked on the input/output die,
wherein the one or more processor chiplets are coupled to the input/output die via one or more processor ports of the input/output die; and
wherein the machine learning accelerator is coupled to the input/output die via a machine learning accelerator port of the input/output die.

2. The processor of claim 1, wherein the machine learning accelerator is configured to perform matrix multiplication operations for one or more of a general matrix multiply operation and a convolution operation.

3. The processor of claim 1, wherein the input/output die includes a data fabric that routes traffic between one or more ports of the input/output die.

4. The processor of claim 3, wherein the data fabric routes traffic based on a destination port for the traffic.

5. The processor of claim 1, wherein the input/output die further comprises an input/output port configured to be coupled to an expansion bus.

6. The processor of claim 1, wherein the input/output die further comprises a memory port configured to be coupled to memory.

7. The processor of claim 1, wherein the machine learning accelerator is configured to accept commands from the one or more processor chiplets, process data based on those commands, and export results of the processing to a destination via the input/output die.

8. The processor of claim 1, wherein the machine learning accelerator is three-dimensionally stacked on the input/output die.

9. A method for communicating between a machine learning accelerator and one or more processing cores, the method comprising:
obtaining data at the machine learning accelerator via an input/output die, wherein the machine learning accelerator is stacked on the input/output die;
processing the data at the machine learning accelerator to generate machine learning processing results; and
exporting the machine learning processing results via the input/output die,
wherein the input/output die is coupled to one or more processor chiplets via one or more processor ports, and
wherein the input/output die is coupled to the machine learning accelerator via an accelerator port.

10. The method of claim 9, wherein the machine learning accelerator is configured to perform matrix multiplication operations for one or more of a general matrix multiply operation and a convolution operation.

11. The method of claim 9, wherein the input/output die includes a data fabric that routes traffic between one or more ports of the input/output die.

12. The method of claim 11, wherein the data fabric routes traffic based on a destination port for the traffic.

13. The method of claim 9, wherein the input/output die further comprises an input/output port configured to be coupled to an expansion bus.

14. The method of claim 9, wherein the input/output die further comprises a memory port configured to be coupled to memory.

15. The method of claim 9, wherein the machine learning accelerator is configured to accept commands from the one or more processor chiplets, process data based on those commands, and export results of the processing to a destination via the input/output die.

16. The method of claim 9, wherein the machine learning accelerator is three-dimensionally stacked on the input/output die.

17. A computing device, comprising:
a processor; and
a memory,
wherein the processor includes:
one or more processor chiplets;
an input/output die; and
a machine learning accelerator, wherein the machine learning accelerator is stacked on the input/output die,
wherein the one or more processor chiplets are coupled to the input/output die via one or more processor ports of the input/output die; and
wherein the machine learning accelerator is coupled to the input/output die via a machine learning accelerator port of the input/output die.

18. The computing device of claim 17, wherein the machine learning accelerator is configured to accept commands from the one or more processor chiplets via the input/output die, to process the one or more commands to generate machine learning results, and to write the machine learning results to the memory via the input/output die.

19. The computing device of claim 17, wherein the machine learning accelerator is configured to perform matrix multiplication operations for one or more of a general matrix multiply operation and a convolution operation.

20. The computing device of claim 17, wherein the machine learning accelerator is three-dimensionally stacked on the input/output die.

* * * * *